United States Patent [19]
Fairbanks et al.

[11] Patent Number: 5,311,813
[45] Date of Patent: May 17, 1994

[54] CUTTING SURFACE HAVING A TENT-LIKE COVER PROVIDING CLOSABLE ACCESS TO THE CUTTING SURFACE

[76] Inventors: Myron J. Fairbanks, 2727 Bradford Cir., West Valley City, Utah 84119; Colin J. Buck, 3205 S. 2112 East, Salt Lake City, Utah 84109

[21] Appl. No.: 997,853

[22] Filed: Dec. 29, 1992

[51] Int. Cl.⁵ .................. A47J 47/00; E04H 15/02; E04H 15/36
[52] U.S. Cl. .......................... 99/645; 99/467; 99/646 R; 135/96; 135/102; 269/289 R
[58] Field of Search ............... 135/95, 96, 102, 116, 135/901, 906; 269/15, 289 R, 302.1; 99/467, 485, 645, 646 R; 119/19, 165

[56] References Cited
U.S. PATENT DOCUMENTS

| | | | |
|---|---|---|---|
| 486,459 | 11/1892 | Gerhard | 135/102 |
| 526,942 | 10/1894 | Rhoads | 135/102 |
| 844,529 | 2/1907 | Meyers | 269/15 |
| 1,411,272 | 4/1922 | Eaton | 135/116 |
| 2,167,219 | 7/1939 | Sankey | 135/102 |
| 2,570,361 | 10/1951 | Mejia | 135/102 |
| 2,804,083 | 8/1957 | Wieber | 119/19 |
| 3,848,279 | 11/1974 | Ipsen, Jr. | 135/96 |
| 4,632,138 | 12/1986 | Irwin . | |
| 4,685,483 | 8/1987 | Balazs . | |
| 4,796,649 | 1/1989 | Tolomay . | |
| 4,829,694 | 5/1989 | Oasheim . | |
| 4,930,534 | 6/1990 | Hill . | |
| 5,009,189 | 4/1991 | Neff | 119/17 |
| 5,088,514 | 2/1992 | House et al. . | |

FOREIGN PATENT DOCUMENTS
249302 4/1962 Fed. Rep. of Germany .
1307057 9/1962 France .
562430 5/1957 Italy .

Primary Examiner—Philip R. Coe
Assistant Examiner—Randall E. Chin
Attorney, Agent, or Firm—Trask, Britt & Rossa

[57] ABSTRACT

A covered cutting board assembly for outdoor use includes a cutting board having a cutting surface, a truss structure attachable to the cutting board forming a support structure for a transparent or semi-transparent cover which encloses the truss structure and cutting board. The cover is structured with at least one opening, closeable by a flap securable thereto, to permit insertion of user's hands therethrough to access the cutting surface. The cover remains in position over the cutting surface to provide protection to food prepared and served on the cutting surface, but allows access to the cutting board as needed. The cutting board assembly also includes a waterproof top sized to fit over the cover to prevent entry of moisture. The top also may have an opening to provide access to the cutting surface for use of the cutting board in rain or snow, and the top may have insulative properties to retain heat within the disclosure. The components of the cutting board assembly are disassemblable from each other and are collapsible to a flattened configuration providing easy storage and transportation in a carrying case which is also described.

19 Claims, 3 Drawing Sheets

CUTTING SURFACE HAVING A TENT-LIKE COVER PROVIDING CLOSABLE ACCESS TO THE CUTTING SURFACE

BACKGROUND

1. Field of the Invention

This invention relates to cutting boards used in food preparation and the like. Specifically, this invention relates to a covered cutting board for use outdoors to provide protection for the cutting board and the food prepared or handled thereon, the cover being structured to provide access to the cutting board surface without removal of the cover.

2. Statement of the Art

Many people like to picnic or go camping, and a significant portion of the time spent in these activities involves the preparation and serving of food. In recognition of the need, a number of products have been developed over the years to aid in preparing and serving food outdoors. However, most people still typically plan their meals prior to leaving home, and prepare and package the individual ingredients for later assembly outdoors. This is because most outdoor locales do not provide any clean or convenient surface upon which food can be freshly prepared.

Further, even if a surface is available, such as a picnic table or the like, the food remains exposed to insects and other sources of contamination during the time the food is being handled. Although some type of cover may be fashioned to temporarily shield the food during times when the food is not being handled, the cover must still be removed during the time the food is handled directly, and the food is thereby exposed to contamination.

Thus, it would be advantageous to provide a cutting surface for use outdoors which has an enclosure positioned over the board, the enclosure having an access formed therethrough to allow a person to access the cutting surface without removing the enclosure from over the board or over the food. It would also be advantageous to provide a covered cutting surface which is structured to be disassemblable for easy storage and transportation.

SUMMARY OF THE INVENTION

In accordance with the present invention, a covered cutting board provides a surface upon which food may be prepared or served while the cutting surface remains covered thereby protecting the food from contaminants. The covered cutting board comprises an assemblage of a cutting board, a truss structure attachable to the cutting board, and a transparent covering sized to fit over the truss structure and adapted to be supported thereby. The transparent covering is structured with an opening through which the cutting board surface may be accessed. The assemblage may also include a waterproof top positionable over the cover to protect the board from moisture, dust or sunlight.

The cutting board of the present invention is structured to provide a flat working surface upon which food may be placed for preparation or serving. The cutting surface may be surrounded about the periphery thereof with a recessed channel into which juices or other fluids may flow. Apertures may be formed through the depth of the board in alignment with the channel to provide drainage of the fluids from the channel.

The cutting board may have any desired dimension of length, width or depth, and may have any suitable shape, such as square or round. The cutting board may be structured with feet or projections which rest upon another surface to raise the cutting board thereabove. Alternatively, or in addition, the cutting board may be structured to cooperate with a revolving pedestal, centered relative to the sides of the board, which allows the board to be rotated about a vertical axis associated with the pedestal.

A truss structure is adapted to attach to the cutting board and to project above the cutting surface of the cutting board without obstructing the cutting surface of the board. The truss structure provides support means for a cover which, when positioned over the truss structure and the cutting board, forms a tent-like enclosure about the cutting surface. The truss structure is most suitably formed from a flexible, yet sturdy material which allows positioning of the truss structure relative to the cutting board.

The truss structure may preferably be detachably attached to the cutting board. However, in an alternative embodiment, the truss structure may be securable to the cutting board in a manner which allows the cutting board to be suspended from the truss structure. In such an embodiment, the cutting board may, for example, be hung from a tree by attachment of a hook to the truss structure.

A cover is provided which is sized to fit over the truss structure and over the outer edges of the cutting board to completely envelope the upper portion of the cutting board, including the cutting surface. The cover is preferably transparent or semi-transparent to allow viewing of the cutting surface and the food positioned thereupon. The cover may be preferably porous, such as a mesh fabric, to allow circulation of air therethrough cover while preventing insects or large dirt or dust particles from infiltrating through the cover.

The cover is structured with at least one opening sized to allow the positioning of two hands therethrough. The opening allows a user to manipulate food and/or utensils on the cutting surface. The opening is closeable by closure means associated with the opening. A particularly suitable closure means may be a flap securable in place over the opening by securement means, such as a zipper or hook and loop tape. The cover may be structured with more than one opening so that more than one person may have access to the cutting surface at any one time. The cover may also be structured with pockets positioned on the external surface of the cover to accommodate convenient storage of utensils.

In use, the assembled cutting board, truss structure and cover provide a three-dimensional enclosure of a cutting surface upon which food may be prepared and served. The flap is disengaged from the opening and the user's hands are inserted through the opening to access the cutting surface. Food is prepared on the cutting surface; for example, a steak may be trimmed of fat and seasoned preparatory to placement on the grill. After the steak is trimmed and seasoned, the user removes his hands from the opening, replaces the flap over the opening and secures the flap in place over the opening. When the grill is sufficiently hot to cook the steak, the flap is unsecured from its position over the opening and the steak is removed through the opening.

A waterproof top may be placed over the cover to prevent rain, small dust particles or sunlight from infiltrating through the cover. Prepared non-perishable foods, such as fruits or vegetables, may be stored on the cutting surface for hours, or overnight, by placing the top over the cover. The top may also be made of a thin insulating material to retain heat within the cover. The top reduces the emanation of food odors from the cutting board assembly thereby reducing the attraction of pests or predators to the food. The top is sized to fit over the cover and truss structure and about the outer edge of the cutting board to substantially enclose the cutting board. The top may be structured with a closeable opening generally corresponding in size and placement to the opening or openings formed in the cover.

The cutting board assembly is structured to be easily disassembled for convenient storage and transport. In particular, the truss structure is configured to allow disassembly into a flattened or two dimensional form. The cutting board assembly may, therefore, include a carrying case sized to receive the board, collapsed truss structure, cover, top, hook and utensils. Because all parts of the assembly can be folded or otherwise manipulated into a flat position, the carrying case has a reduced width dimension facilitating carrying and storage of the case.

BRIEF DESCRIPTION OF THE ILLUSTRATED EMBODIMENTS

In the drawings, which illustrate what is currently considered to be the best mode for carrying out the invention, FIG. 1 is an exploded perspective view of the cutting board assembly;

DETAILED DESCRIPTION OF THE ILLUSTRATED EMBODIMENTS

Figure 1:
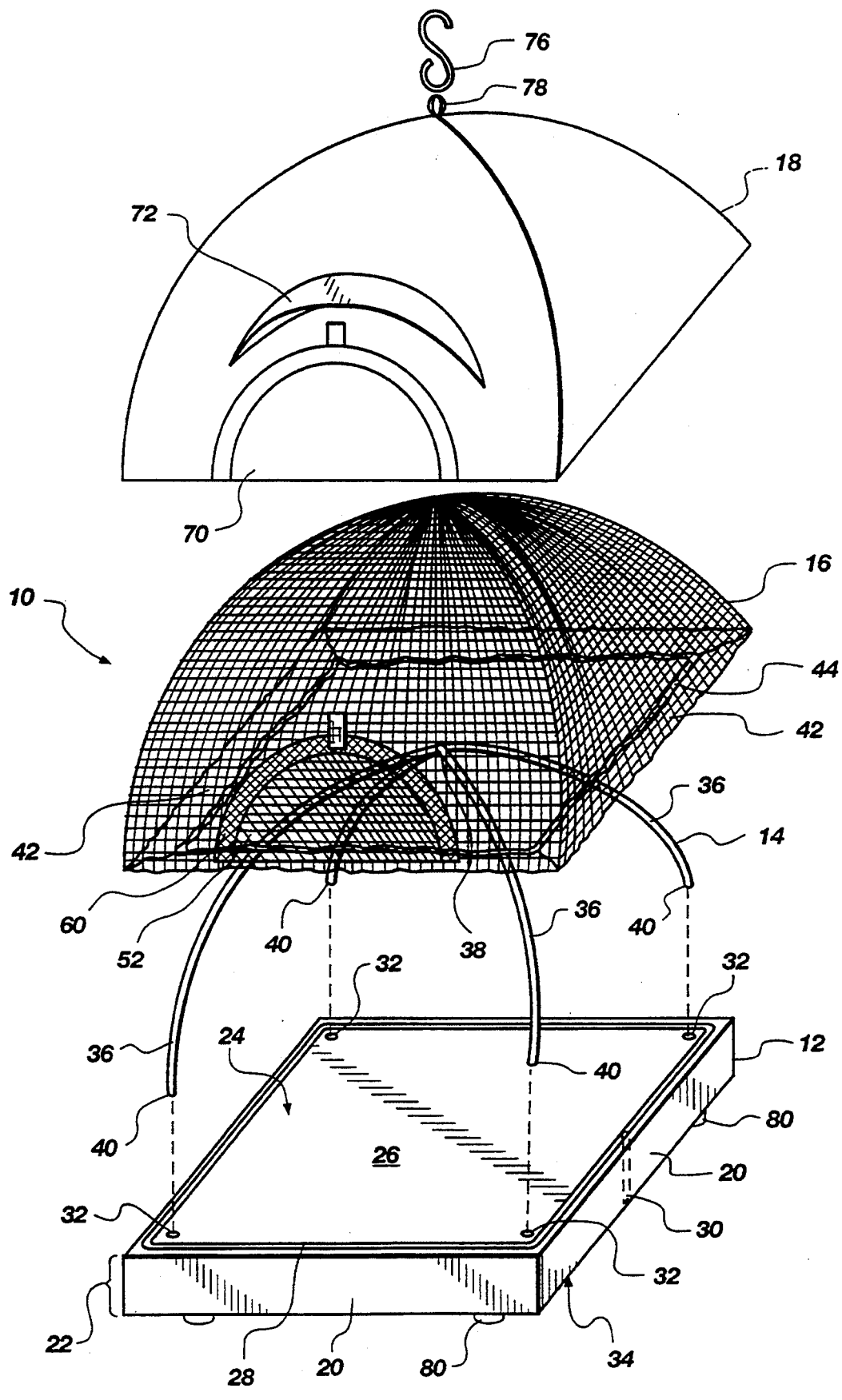

FIG. 1 illustrates the general components of the cutting board assembly 10 of the present invention, and particularly illustrates the cutting board 12, the truss structure 14, the cover 16 and the top 18.

The cutting board 12 shown in FIG. 1 is generally square having sides 20 of equal length and having a specified height or thickness 22. Although the cutting board 12 is here illustrated as being generally square, the board may be any shape, including round. Further, the cutting board may be of any size or horizontal dimension suitable for preparing or serving food. The cutting board 12 may be made from any suitable material such as wood, plastic, metal or stone.

An upper surface 24 of the board 12 forms the cutting surface 26 upon which food is placed for preparation or service. A channel 28 may be formed in the upper surface 24 about the periphery of the board 12 to receive juices or other fluids which flow from the food. Apertures 30 may also be formed through the thickness 22 of the board 12 in alignment with the channel 28 to allow collected fluids to drain from the channel 28. Preferably, the depth of the channel 28 increases with proximity to the aperture 20 in order to provide a downwardly sloping grade to facilitate drainage of fluid toward the aperture 30.

The cutting board 12 is structured to provide attachment of the truss structure 14 thereto. As shown in FIG. 1, the means for attachment may be the formation of cavities 32 in the upper surface 24 of the board 12 sized to receive a portion of the truss structure. Alternatively, the board 12 may be structured to provide attachment of the truss structure 14 to the sides 20 of the board 12 or to the under side 34 of the board 12.

The truss structure 14 of the invention generally comprises a frame which extends upwardly from the cutting board 12 to support a cover 16. The truss structure 14 shown in FIG. 1 comprises a plurality of arcuately-shaped rods 36 formed of flexible material, such as plastic or metal. The rods 36 may be joined together at the apex 38 of their common arc, or may be separate from each other. Each rod 36 ends in a tip 40, and each tip 40 is insertable into a corresponding cavity 32 formed in the board 12.

Although the truss structure 14 is shown in FIG. 1 as attaching to the upper surface 24 of the board 12, the truss structure may be attached to the board 12 in any other suitable manner which provides an upstanding frame. For example, an additional bracket (not shown) could be interconnected between the rods 36, and the bracket could be structured to attach to the sides 20 of the board 12 or beneath the board 12. The truss structure may further be structured to attach securely to the cutting board 12, such as by screws or clamps. Although the truss structure 14 shown provides a generally hemispherical frame, the frame may be any other appropriate shape, such as cuboidal or tetrahedral.

The cover 16 is generally tent-shaped and is sized to fit over the truss structure 14, down the sides 20 of the board 12 and beneath the periphery of the board 12. Alternatively, the cover 16 may be integrally formed to the truss structure so that the truss structure 14 and cover 16 are a single unit. To conform the cover 16 to the periphery of the board 12, and to facilitate attachment of the cover 16 to the board 12, the cover 16 may be structured with a hem 42 about the lower edge, and constriction means associated with the hem 42 facilitate conformance of the cover 16 about the board 12. Such constriction means may be an elasticized band 44 secured to or in the hem as shown in FIG. 1, or a drawstring having slidable locking means through which the ends of the drawstring are threaded.

The cover 16 is formed of a transparent or semitransparent material to allow viewing of the cutting surface 26. The cover 16 may or may not be porous. A particularly suitable material for forming the cover 16 is a fine mesh or net material which allows air to circulate therethrough while keeping fine dust or dirt particles from infiltrating through the cover 16.

The cover 16 is formed with at least one opening 46 (shown in FIG. 2) which is closeable by closure means associated with the opening. As shown more clearly in FIG. 2, which illustrates the assemblage of the cutting board components, the opening 46 provides access to the cutting surface 26 of the board 12 and is sized to permit insertion of two hands therethrough. The area of the cover 16 surrounding the opening 46 may be preferably reinforced by, for example, attachment of a stabilizing rod 48. In a preferred embodiment, the stabilizing rod 48 is inserted in a passageway formed about the opening by application of a sleeve 50 of material.

Figure 2:
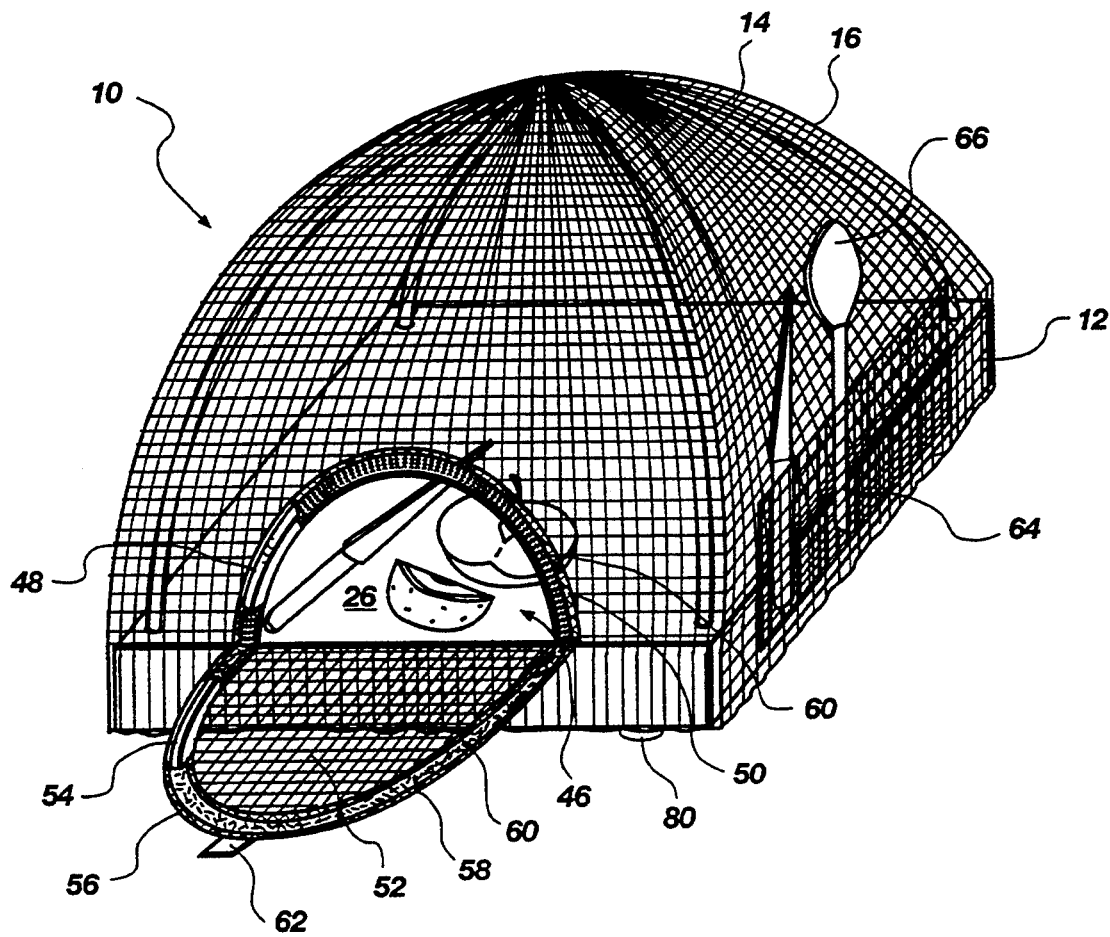
FIG. 2 is a perspective view of the invention in assembled form, some portions being shown in partial cutaway.

The closure means illustrated in FIG. 2 is a flap 52 which may preferably be made of the same material as the remainder of the cover 16 and is securely attached to the cover 16 below the opening 46. The flap 52 may preferably have a stabilizing rod 54 positioned about the outer edge 56 of the flap 52 and may be inserted through a passageway formed by the attachment of a sleeve 58 of material along the edge of the flap 52.

Securement means 60 is associated with the opening 46 and the flap 52 to secure the flap 52 over the opening 46. As shown in FIG. 2, the securement means 60 may be a strip of hook and loop material attached about the edge of the opening 46 and attached about the outer edge 56 of the flap 52. Other suitable securement means 60 may include a zipper, snaps or hooks and eyes. A pull tab 62 may be attached to the flap 52 to aid in detaching the flap 52 from the opening 46.

Although the cover 16 shown in FIGS. 1 and 2 has only one opening 46, the cover 16 may have other openings to allow more than one person access to the cutting surface 26 at any one time. The cover 16 may also be structured with pockets 64 along the sides thereof to conveniently hold napkins, utensils 66 or other objects in close proximity to the cutting board 12.

Referring again to FIG. 1, the invention may also include a top 18 sized to fit over the cover 16 which is in turn positioned over the truss structure 14 and cutting board 12. The top 18 may preferably conform to the shape of the cover 16 and may be sized to simply enclose the cover 16 at the level of attachment of the cover 16 to the board 12. Preferably, the top 18 is sized to fit beneath the peripheral edge of the board 12 similar to the cover 16, and may be formed with an elasticized hem to conform to the board 12. The top 18 is waterproof, and may be non-porous. The top 18 may be transparent or semi-transparent, but may be most suitably opaque. The top 18 may be made of thin insulating material to retain heat within the cover 16 and top 18 and to deflect sunlight.

An opening, closeable with a flap 70, may be formed in the top 18 to allow access to the opening 46 in the cover 16, and thus access to the cutting surface 26. The flap 70 in the top 18 includes securement means (not shown) in a manner similar to the flap 52 in the cover 16 to provide securement of the flap 70 against the opening in the top 18. The top 18 may also be structured with a visor 72 positioned over the flap 70 and opening so that water may be deflected away from the opening when the invention is used in the rain or snow.

Another feature which may be included in the cutting board assembly 10 is a hook 76, shown in FIG. 1, which engages a loop 78 attached at the upper point of the top 18. The hook 76 may preferably also engage the apex 38 of the truss structure 14 to stably grasp the cutting board assemblage. Understandably, the truss structure 14 must be secured to the cutting board 12 if the hook 76 is to be attached to the truss structure 14. The hook 76 allows the cutting board assembly 10 to be suspended from above, such as by attachment to a tree branch. Foods kept on the cutting board may thereby be elevated above the reach of children or scavenging animals.

Figure 3:
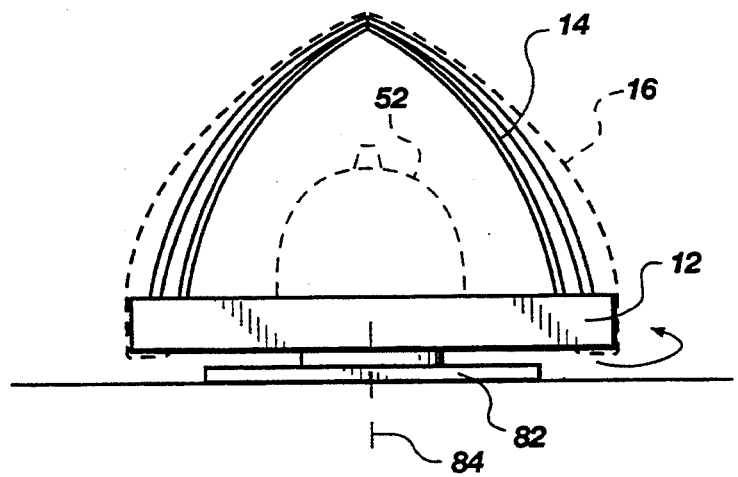
FIG. 3 is a side elevational view of the invention illustrating a pedestal.

The cutting board 12 may be elevated above a surface upon which it is placed by means of feet 80 attached to the under side 34 of the board 12, as shown in FIG. 1. Alternatively, the board 12 may lack feet 80 and may therefore rest directly on an underlying surface. In an alternative embodiment shown in FIG. 3., the board may be placed upon a pedestal 82 structured to allow rotation of the board 12 about a central axis 84 associated with the pedestal 82. The pedestal 82 may be permanently attached to the under side 34 of the board 12 or, more suitably, may be attachable to the under side 34 of the board 12.

Figure 4:
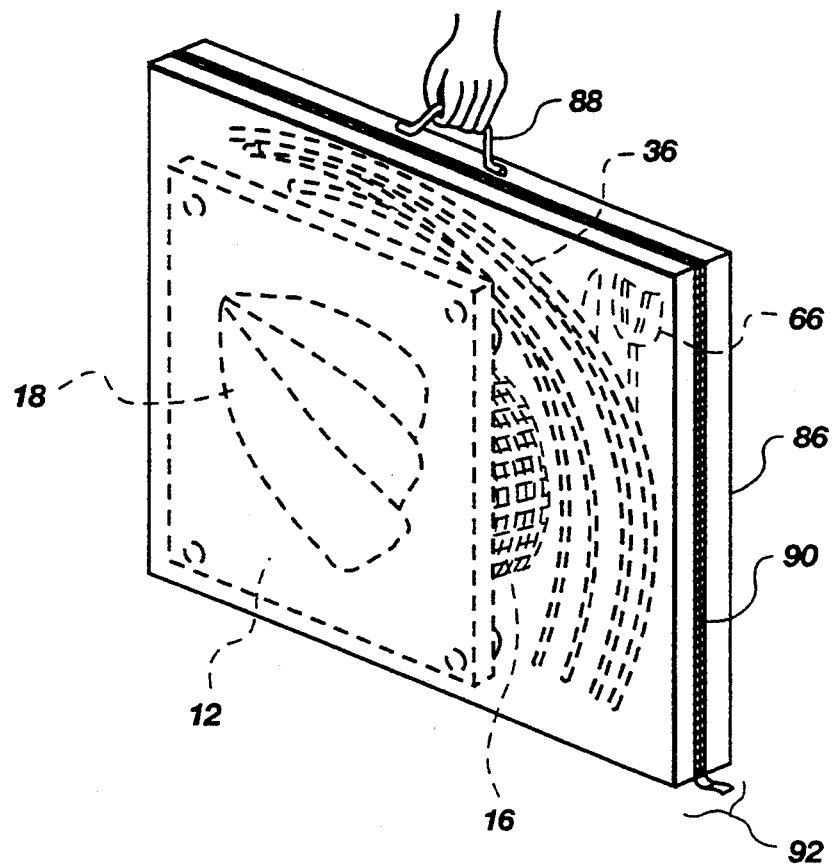
FIG. 4 is a perspective view, in partial phantom, of a carrying case enclosing the components of the cutting board assembly.

The cutting board assembly 10 of the present invention is structured to be disassemblable for easy storage and transportation. Thus, the disassembled components of the cutting board assembly 10 may be placed in a carrying case 86, shown in FIG. 4, which is sized to receive all of the components in the most compact manner. The carrying case 86 has a handle 88 for grasping and carrying, and may also include a shoulder strap (not shown). The carrying case 86 includes closure means 90, such as a zipper, to secure the components, shown in phantom line, within the carrying case 86. Because the components may be disassembled and/or folded into a relatively flat form, the width 92 of the carrying case 86 may, as a result, be narrow facilitating easy storage and transportation.

The present invention is directed to providing a covered cutting board for use in the outdoors which protects the cutting surface and food prepared or served thereon from contamination. The general structure may be adapted to any similar need for protection of a working area, and the structure of the invention may be modified to meet the demands of the particular application. Hence, reference herein to specific details of the illustrated embodiments is by way of example and not by way of limitation. It will be apparent to those skilled in the art that many additions, deletions and modifications to the illustrated embodiments of the invention may be made without departing from the spirit and scope of the invention as defined by the following claims.

What is claimed is:

1. A disassemblable, coverable cutting board assembly comprising:
   a cutting board having an upper surface providing an area upon which to prepare and serve food;
   truss structure attachable to said cutting board, said truss extending upwardly over said cutting board;
   a cover positionable over said truss structure to form a tent-like enclosure over said cutting board said cover having at least one opening formed therein providing access to said cutting board, said opening being closeable by closure means;
   securement means associated with said opening and said closure means of said cover to secure said closure means in a closed position; and
   a waterproof top positionable over said cover.

2. The cutting board assembly of claim 1 wherein said cover is substantially transparent permitting viewing of said cutting board therethrough.

3. The cutting board assembly of claim 2 wherein said opening in said cover is reinforced by first stabilizing means.

4. The cutting board assembly of claim 3 wherein said closure means is a flap positionable over said opening, said flap being reinforced by second stabilizing means.

5. The cutting board assembly of claim 4 wherein said securement means is interlockable hook and loop fabric.

6. The cutting board assembly of claim 5 wherein said cover further includes a pocket on an exterior surface thereof for placement of objects therein.

7. The cutting board assembly of claim 3 wherein said top further includes an opening formed therethrough for access to said cover, said opening of said top being closeable by a closure means associated therewith.

8. The cutting board assembly of claim 7 wherein said top further includes a visor positioned above said opening, said visor sized to extend over said opening a distance to prevent rain from entering into said opening.

9. The cutting board assembly of claim 7 wherein said top is formed from insulating material to retain heat therein.

10. The cutting board assembly of claim 2 wherein said cutting board includes a channel formed on said upper surface to collect fluids therefrom.

11. The cutting board assembly of claim 10 wherein said cutting board further includes at least one aperture formed through said cutting board and aligned with said channel to drain said fluid away from said channel.

12. The cutting board assembly of claim 2 wherein said cutting board further includes a pedestal positioned on a bottom surface of said cutting board, said pedestal being structured to provide rotation of said cutting board about a vertical axis associated with said pedestal.

13. The cutting board assembly of claim 2 further including a hook attachable to said top for suspending said cutting board assembly above a surface.

14. The cutting board assembly of claim 2 further including a carrying case sized to receive said cutting board, said truss structure, said cover and said top when disassembled each from the other.

15. The cutting board assembly of claim 1 wherein said cutting board is integrally formed with said truss structure.

16. A disassemblable, coverable cutting board assembly comprising:

a cutting board having an upper surface providing an area upon which to prepare and serve food;

truss structure attachable to said upper surface of said cutting board, said truss structure extending upwardly over said cutting board;

a substantially transparent cover positionable over said truss structure to form a tent-like enclosure over said cutting board and being sized to provide for placement of two hands therethrough, said opening being closeable by flap means;

securement means associated with said opening and said flap means of said cover to secure said flap means in position over said opening;

a waterproof top positionable over said cover, said top having an opening formed therethrough providing access to said cover, said opening of said top being sized to provide for placement of two hands therethrough, said opening of said top being closeable by a flap associated therewith; and a visor positioned over said opening in said top, said visor extending over said opening a distance to deflect water away from said opening.

17. The cutting board assembly of claim 16 wherein said cutting board is structured with a channel formed in said upper surface for collection of fluids from said upper surface, and further including an aperture formed through said cutting board in alignment with said channel to facilitate drainage of fluids from said channel.

18. The cutting board assembly of claim 17 wherein said cover is structured with pockets on an outer surface of said cover.

19. The cutting board assembly of claim 18 wherein said cutting board is attachable to a pedestal to facilitate rotation of said cutting board about a vertical axis.

* * * * *

UNITED STATES PATENT AND TRADEMARK OFFICE
CERTIFICATE OF CORRECTION

PATENT NO. : 5,311,813

DATED : 5/17/94

INVENTOR(S) : Fairbanks et al.

It is certified that error appears in the above-identified patent and that said Letters Patent is hereby corrected as shown below:

In the Abstract, line 8, after "of" insert --a--;

In Column 6, line 43, after "truss" insert --structure--;

In Column 6, line 45, insert a comma after "board";

In Column 8, line 8, after "board" insert --, said cover having at least one opening formed therein providing access to said cutting board--.

Signed and Sealed this

Eleventh Day of October, 1994

Attest:

BRUCE LEHMAN

Attesting Officer

Commissioner of Patents and Trademarks